Aug. 27, 1963     G. E. MADER, JR     3,101,898
TEMPERATURE MEASUREMENT AND CONTROL
Filed Feb. 10, 1961
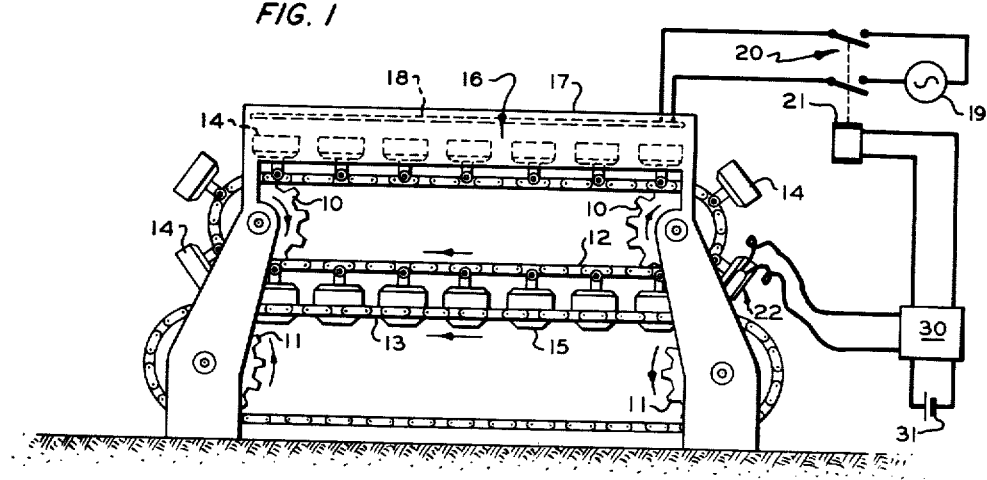
FIG. 1
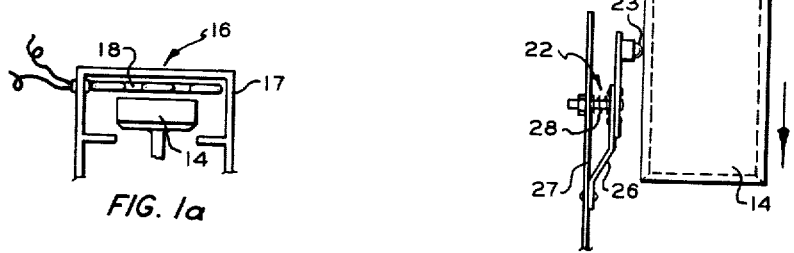
FIG. 1a     FIG. 2
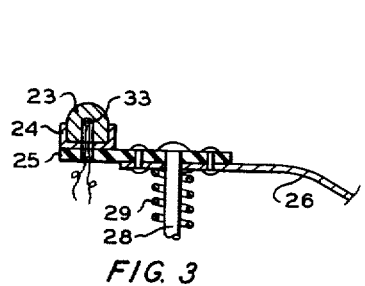     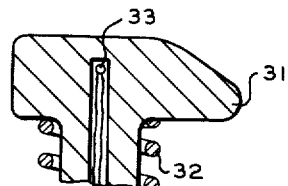
FIG. 3     FIG. 4
INVENTOR.
G.E. MADER, JR.
BY
ATTORNEYS

United States Patent Office 3,101,898
Patented Aug. 27, 1963

3,101,898
TEMPERATURE MEASUREMENT AND CONTROL
George E. Mader, Jr., Bartlesville, Okla., assignor to Phillips Petroleum Company, a corporation of Delaware
Filed Feb. 10, 1961, Ser. No. 88,518
4 Claims. (Cl. 236—15)

This invention relates to temperature measuring and controlling method and apparatus. In one aspect this invention relates to the determination of an average or composite temperature. In another aspect this invention relates to temperature control of a plurality of heated elements with a single control function. In another aspect this invention relates to improved thermoplastic heat sealing, utilizing temperature control of a plurality of heated sealing elements.

When it is desired to heat a plurality of elements and the temperature must be controlled accurately it is possible, in some instances, to utilize separate heating means for each element and to provide individual temperature sensing and control means. However, such individual control often is not desirable and at times is not possible in a practical sense. In any event such individual heat supply and control are complicated and expensive. Another alternative is to measure the temperature of a single element and to control the overall heat supply responsive to this single measurement. This, however, often does not provide the control accuracy necessary to the particular operation.

An object of this invention is to provide an average or composite temperature measurement.

Another object of this invention is to provide an accurate, simple and economical temperature control for a plurality of elements.

Another object of this invention is to provide improved thermoplastic heat sealing.

Other aspects, objects and the several advantages of the invention are apparent from the disclosure, the drawing and the appended claims.

According to my invention there are provided method and apparatus for determining a composite temperature of a plurality of heated elements by transferring heat proportionately from the elements to a temperature sensing means having sufficient heat capacity so that its temperature is intermediate the temperatures of the hottest and coldest elements. Control of the temperature of the elements is accomplished by controlling the heat supplied to the elements in response to the composite temperature. The control system is not limited to a single type of heating means but is applicable, for example, both to a system utilizing individual heaters associated with the elements as well as to a system utilizing a single heater from which all of the elements draw their heat supply.

Further, according to my invention there are provided method and apparatus for controlling the heat supplied to a plurality of heated elements by supplying heat as a function of the temperature of a temperature sensitive element which contacts the heated element serially.

Further, according to my invention there are provided method and apparatus for heat sealing thermoplastic material whereby a plurality of spaced thermoplastic units are passed through a sealing zone in which each unit passes in heat sealing relationship with a corresponding heat transferring sealing element wherein the temperatures of these elements are controlled responsive to an average or composite temperature obtained from the elements.

Further, according to my invention there are provided method and apparatus for heat sealing thermoplastic material whereby a plurality of spaced thermoplastic units are passed through a sealing zone in which each unit passes in heat sealing relationship with a corresponding heat transferring sealing element, wherein the heat supplied to the sealing element is controlled by a single temperature control system, the temperature sensing element of which contacts the sealing elements serially.

In the drawing, FIGURE 1 is a diagrammatic elevation of a thermoplastic package sealing machine incorporating the present invention and showing, schematically an electrical control system.

FIGURE 1a is a vertical cross section of a radiant heater incorporated in the machine of FIGURE 1.

FIGURE 2 is a view of a temperature sensing device suitable for use in this invention in operating relationship with a heat transferring sealing element.

FIGURE 3 is an enlarged cross section of a portion of the temperature sensing device of FIGURE 2.

FIGURE 4 is a vertical cross section of another embodiment of a portion of a temperature sensing device suitable for practicing this invention.

The machine illustrated in FIGURE 1 comprises upper and lower sets of driving sprockets 10—10 and 11—11 which are driven by a suitable source of power, not shown, and synchonized so that the linear rate of travel of upper chain 12 is the same as the linear rate of travel of lower chain 13, so that sealing elements 14 register with the thermoplastic packages 15 to be sealed. If desired, suitable automatic means for loading packages 15 into the carriers which are moved by chain 13 can be provided and, similarly, an automatic unloading and conveying device can be provided at the discharge end. The lids for the various packages 15 can be provided by inserting individual lids on each container either manually or automatically or by providing a roll of thermoplastic material in sheet form which is fed into place on the top of the packages as they proceed through the sealing machine. A heater 16 is provided as shown and this heater is illustrated in cross section in FIGURE 1a. It comprises an outer insulating cover 17 and a number of electrical heating elements 18. The sealing elements 14 pass through heater 16 and heat is transferred to them from heating elements 18 by radiation. Electrical power is supplied to the heating elements 18 from a source 19 through the contacts 20 of a relay actuated by coil 21. A temperature averaging sensing element 22 contacts the sealing elements 14 as they approach sealing contact with the packages 15. Sensing element 22 comprises a mass of material having some appreciable heat storage capacity and a temperature sensitive element. Temperature sensing element 22 actuates controller 30 which is connected to a source of electrical power 31 to actuate coil 21 and, in turn, contacts 20.

Temperature sensing element 22 is illustrated in more detail in FIGURE 2 and FIGURE 3, and comprises mass 23 of a suitable material having appreciable heat storage capacity and relatively good conductivity. Mass 23 is suitably carried in holder 24 which is attached to insulating strip 25 as, for example, by cementing. Insulating strip 25 is carried by spring member 26 which in turn is fastened to support 27 by which it can be positioned relative to the moving sealing elements 14. A restraining member 28 is provided as shown to maintain mass 23 in position during the time it is not contacting a sealing element 14 and to hold it in position to be contacted by the next element in line. Spring 29 holds mass 23 pressed against each sealing element in turn.

As each sealing element 14 passes by and is contacted by temperature sensing element 22, heat is transferred between element 14 and mass 23. Since mass 23 has some heat storage capacity its temperature is effected by a plurality of the elements 14. That is to say, if a particular element 14 being contacted has a temperature higher than element 23, heat is transferred to element 23 and its temperature is raised but not necessarily as high as the temperature being contacted. If the next element in turn also has a temperature higher than mass 23 the temperature of this mass is raised still further. On the other hand when a sealing element 14 having a temperature lower than mass 23 is contacted heat is transferred from the mass to the element and the temperature of the mass is lowered. Thus, over a period of time the temperature of mass 23 becomes a function of a composite temperature of the sealing elements. In this application the temperature is termed "composite" or "average" by which is meant the temperature of mass 23 is less than the highest temperature of any element 14 and greater than the lowest temperature of any element 14 as they pass the point of contact. This is not intended to imply that the temperature of mass 23 is an exact arithmetical average but that its temperature is a function of the indivdual temperatures of the sealing elements 14 and is intermediate the lowest and highest temperature. The sensitivity of the control is a function of the heat storage capacity of the mass 23. As this mass is made smaller the temperature is effected more readily by the heat exchange with the elements 14 and the temperature at any given time approaches closer to the temperature of an individual element while as the mass is made larger the temperature varies less readily with a variation of temperature of an individual element being contacted and approaches more closely to an arithmetical average of the temperatures of the elements 14.

The form of contacting element illustrated in FIGURE 4 is especially suited for use in an application wherein the various elements being contacted are subject to misalignment. This device includes a tapered face 31 which is made long enough and at a proper angle to permit the misaligned elements to force the contacting member against the force of a spring 32 to permit contact between the two without binding and possible breakage.

Each of the temperature sensing elements 22 is provided with a temperature sensitive element 33. Suitably, this element 33 is a thermocouple or a thermistor properly chosen for the range of temperatures encountered in the particular application. Controller 30 is a suitable commercial controller chosen for use with the thermocouple or the thermistor to provide an on-off control for the heater 16.

In other embodiments each heater 14 is provided with an individual heating element, the electrical energy supplied by means of a continuous bus-bar and brushes, and the contacts 20 control the supply of energy to the bus-bars.

My invention, noted above, relates to the combination of the temperature averaging control system and the continuous thermoplastic package sealing machine. However, the temperature averaging control system is applicable to other combinations. For example, in the manufacture of ceramic objects, in some instances, it is desirable to provide accurately controlled temperature for a soaking or cooling step. This can be provided by contacting the ceramic objects with a temperature sensing element according to my invention, and controlling the temperature of the chamber accordingly. The ceramic objects can be moved by the sensing element, with suitable conveying means or provision can be made to move the element itself by a plurality of ceramic objects.

To illustrate the inadequacy of control of a plurality of sealing elements by the measurement of the temperature variation of one of the blocks, aluminum blocks, each very accurately made, having dimensions of 1 inch x 6 inches x 6 inches, and having holes drilled therein to fit accurately cylindrical electrical heaters, were mounted identically on rails and subjected to the same ambient temperature. With 1 block controlled within ±1° F. there were temperature variations of the blocks not controlled of ±6 to 8° F.

In determining the proper material for use for the mass 23 or for the contacting element illustrated in FIGURE 4, the thermal conductivity, specific heat, density and surface characteristics are important properties to consider. High conductivity is always desirable since this has a tendency to maintain all parts of the mass at the same temperature and therefore most accurately maintain an equal distribution of the heat content and thus permit an accurate determination of the composite temperature desired. Ordinarily a relatively high specific heat is desirable as this permits a greater degree of averaging with a smaller mass, and consequently reduced tendency for temperature variation within the mass. However, since specific heat usually is referred to mass or, for example, calories per gram, and thermal conductivity generally is referred to volume or, for example, calories per second through a plate one centimeter thick across an area of one square centimeter, density must be considered when determining the relative value of different materials in a specific application. The smaller the coefficient of friction between the material chosen for use as the mass, and the material of sealing elements which are contacted, the less will be the tendency for damage to either. The contacting element also should wear at a low rate, cause little frictional resistance, and cause as little wear on the sealing element as possible. Copper is a very desirable material for use as this mass, while aluminum is useful in some situations. However, a preferred material for many applications is the material sold under the name "Graphalloy," by Graphite Metallizing Corporation, a molded graphite or carbon-graphite impregnated with molten metal. Copper Graphalloy, in which the added metal is copper, has a thermal conductivity and specific heat very nearly the same as copper, and has very good friction and wear characteristics.

The averaging effect of the temperature sensing element is effected also by its size and configuration. The total heat capacity of the element is an important consideration and this is a function both of the specific heat and the mass. Given a high conductivity, a material of a relatively low specific heat can be used and will function satisfactorily since a somewhat larger mass of material can be utilized. Of course, the position of the temperature sensing element within the mass also is important since, if this location is too near the contacting surface the device tends to vary with the temperature of the individual components being contacted rather than with their average temperature while, if the location is too far from the contacting surface ambient conditions may exert an undue influence. Where desired the element can be provided with an insulating covering, except, of course for the contacting surface itself, to reduce the effect of ambient conditions.

Although the invention is described in connection with applications in which elements are heated, it is also applicable for use where a plurality of elements are cooled, in which case the temperature sensing device, when it assumes a composite temperature, is below ambient temperature. The composite temperature can be used to control refrigeration means for the cooled elements.

Reasonable variation and modification are possible within the scope of the foregoing disclosure, the drawing and the appended claims, in which are set forth method and apparatus for determining a composite temperature, for controlling the temperature of a plurality of heated elements according to the composite temperature of the elements, as well as improved method and apparatus for heat sealing thermoplastic packages wherein the sealing elements are temperature controlled according to a composite temperature of these elements.

I claim:

1. A method for heat-sealing thermoplastic material which comprises passing a plurality of spaced thermoplastic units through a sealing zone, simultaneously passing through said sealing zone a plurality of separate heat transferring sealing elements in substantially non-heat transferring relation to each other to supply sealing heat to said units, passing said elements successively through a temperature sensing zone having substantial heat retention capacity, transferring heat between said elements and said sensing zone whereby the temperature of said zone is representative of a composite temperature of said elements, measuring the temperature of said sensing zone and automatically controlling the supply of said heat to said heated elements responsive thereto.

2. A method for heat-sealing thermoplastic material which comprises passing a plurality of spaced thermoplastic units through a sealing zone, simultaneously passing through said zone a plurality of separate heat transferring sealing elements in substantially non-heat transferring relation to each other to supply sealing heat to said units, passing said elements successively through a temperature sensing zone having substantial heat retention capacity, passing said elements through a heating zone, transferring heat between said elements and said sensing zone whereby the temperature of said sensing zone is representative of a composite temperature of said elements, measuring the temperature of said sensing zone and automatically controlling the supply of heat to said heating zone responsive thereto.

3. A method for heat sealing thermoplastic material which comprises passing a plurality of spaced thermoplastic units through a sealing zone, simultaneously passing through said sealing zone a plurality of separate heat transferring sealing elements in substantially non-heat transferring relation to each other to supply sealing heat to said units, passing said elements successively through a temperature sensing zone having substantial heat retention capacity, transferring heat between said elements and said sensing zone whereby the temperature of said zone is representative of a composite temperature of said elements, measuring the temperature of said zone, supplying heat to said elements and automatically controlling said heat responsive to said temperature.

4. Apparatus for heat sealing thermoplastic material comprising means for passing a plurality of spaced thermoplastic units through a sealing zone, means for simultaneously passing through said zone a plurality of separate heat transferring sealing elements in substantially non-heat transferring relation to each other to supply sealing heat to said units, means for controlling the temperature of said sealing elements comprising a temperature averaging unit comprising a body having substantial heat storage capacity and means to measure the temperature of said sealing elements comprising a elements serially with said unit whereby an exchange of heat proportionate with the difference of temperature between said elements and said unit takes place, means for supplying heat to each of said elements and means for controlling said means for supplying heat responsive to said temperature measuring means.

References Cited in the file of this patent

UNITED STATES PATENTS

| | | |
|---|---|---|
| 1,775,682 | Martin | Sept. 16, 1930 |
| 1,808,241 | Martin | June 2, 1931 |
| 1,888,098 | Swaney | Nov. 15, 1932 |
| 2,095,877 | Junkins | Oct. 12, 1937 |
| 2,275,265 | Mead | Mar. 3, 1942 |
| 2,530,973 | Kirsh et al. | Nov. 21, 1950 |
| 2,738,631 | Jarund | Mar. 20, 1956 |
| 2,896,387 | Brock | July 28, 1959 |
| 3,025,705 | Blake et al. | Mar. 20, 1962 |

UNITED STATES PATENT OFFICE

CERTIFICATE OF CORRECTION

Patent No. 3,101,898                                      August 27, 1963

George E. Mader, Jr.

It is hereby certified that error appears in the above numbered patent requiring correction and that the said Letters Patent should read as corrected below.

Column 6, line 16, for "sealing elements comprising a" read -- body, means to contact said --.

Signed and sealed this 28th day of April 1964.

(SEAL)
Attest:

ERNEST W. SWIDER                                     EDWARD J. BRENNER
Attesting Officer                                           Commissioner of Patents